United States Patent [19]
Granzotto

[11] Patent Number: 5,203,606
[45] Date of Patent: Apr. 20, 1993

[54] TWO SECTION-BICYCLE SADDLE WITH MOVABLE FRONT SECTION

[75] Inventor: Artemio Granzotto, Schlieren, Switzerland

[73] Assignees: Michele A. Chiarella, Lugano, Switzerland; Giuseppe Bigolin, Rossano Veneto, Italy

[21] Appl. No.: 628,713

[22] Filed: Dec. 17, 1990

[30] Foreign Application Priority Data

Jun. 6, 1990 [CH] Switzerland ............... 1894/90

[51] Int. Cl.⁵ .............................................. B60N 2/02
[52] U.S. Cl. ..................................... 297/201; 297/312
[58] Field of Search ............... 297/201, 203, 195, 284, 297/312

[56] References Cited

U.S. PATENT DOCUMENTS

| | | | |
|---|---|---|---|
| 604,955 | 5/1898 | Avery | 297/201 |
| 701,390 | 6/1901 | Provoost | 297/201 |
| 1,836,630 | 12/1931 | Thum | 297/312 X |
| 2,332,847 | 10/1943 | Franke | 297/195 |
| 3,883,173 | 5/1975 | Shephard et al. | 297/201 X |

Primary Examiner—Kenneth J. Dorner
Assistant Examiner—J. Bonifanti
Attorney, Agent, or Firm—Nicholas L. Coch

[57] ABSTRACT

The saddle has a broad rear section, a narrow front section and a frame and saddle cover. To make the saddle more comfortable and prevent injury to the cyclist, the front section can be slid, facing rear section downward and forward against a pre-stress.

4 Claims, 1 Drawing Sheet

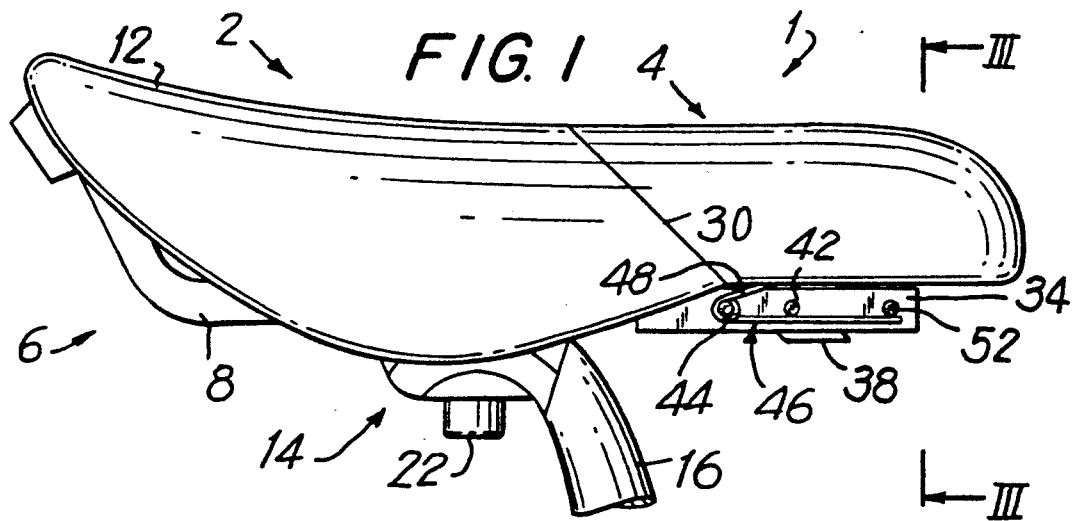
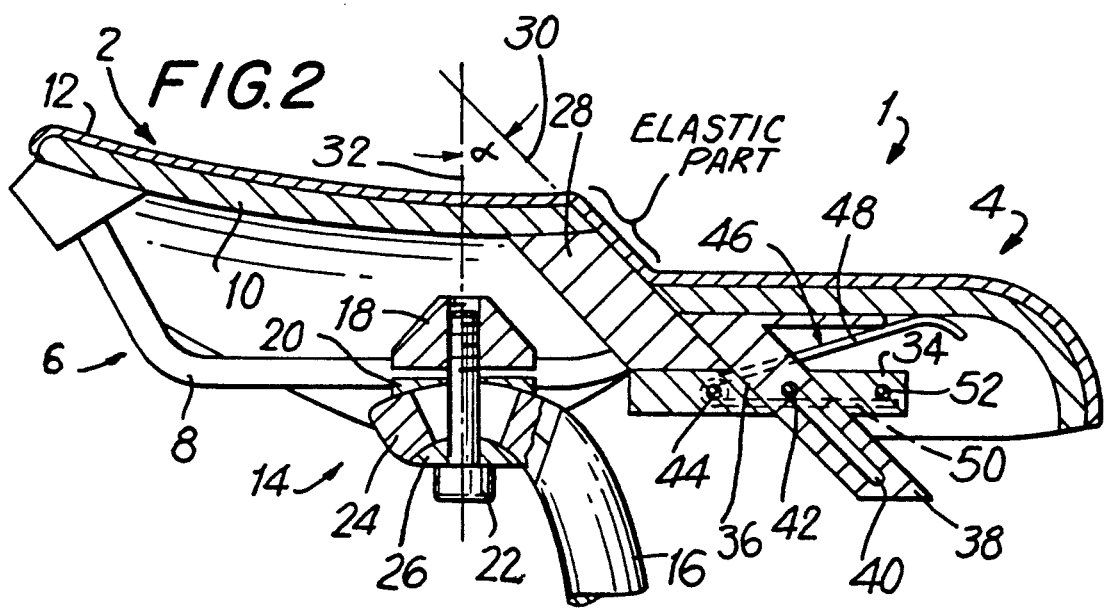
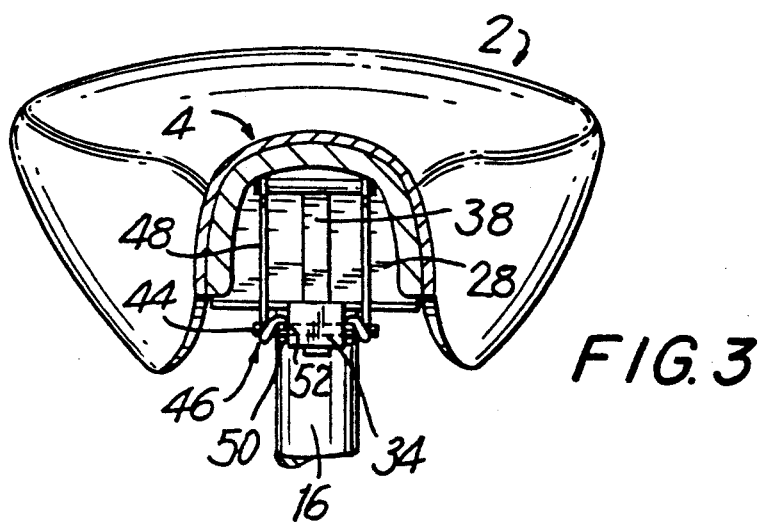

TWO SECTION-BICYCLE SADDLE WITH MOVABLE FRONT SECTION

FIELD OF THE INVENTION

The present invention is related to bicycle saddles, and more particularly to a bicycle saddle having a pre-loaded front section.

BACKGROUND OF THE INVENTION

Saddles for bicycles are available in the various shapes and designs. Many of such saddles, however, are constructed in a manner which results in discomfort to women, and more particularly to male cyclists, particularly in the genital area, which is subject to great pressure upon a rider, creating discomfort and possible injury. This problem is particularly acute in racing bikes, on which cyclists do not sit upright, but bend so far forward that the upper body is virtually horizontal. It is therefore desirable to have a bicycle seat whose front section bends forward, as does the rider, yet whose front section does not bend so far forward that the rider falls and further injures himself/herself.

U.S. Pat. No. 1,881,136 and German Patent DE-PS 551059 disclose bicycle saddles which have separate front and rear sections with a spring-loaded front section. The abrupt separation of the front and rear parts of such seats creates a sharp drop from the upper edge of the rear section by the vertical downward movement of the front section. Additionally, the perpendicular space created by the movement of the front section does not offer sufficient support for the cyclist so that sitting becomes even less comfortable than on a typical, "one-piece" bicycle saddle.

Because of such drawbacks of prior art saddles, it is an object of the present invention to create a saddle which provides greater support for the genital area.

Another object of the invention is to create a two-section saddle which provides a "pre-loaded" support for the genital area.

Yet another object of the invention is to provide a seat which does not create a sharp perpendicular space between the front and rear sections of the saddle and is comfortable for the rider.

SUMMARY OF THE INVENTION

These and other objects of the invention which will become apparent hereafter are achieved by applicant's "BICYCLE SADDLE" which has a front section and a separate rear section. The front section slides downwardly and forwardly along an angular, slide plane, but against a "pre-load" created by a spring or similar means.

The invention will be better understood by the Detailed Description of the Preferred Embodiment section, in conjunction with the appended drawings of which:

BRIEF DESCRIPTION OF THE DRAWINGS

FIG. 1 is a side perspective view of the inventive saddle with a movable front section;

FIG. 2 is a lateral, cross-sectional view across lines III—III of the saddle of FIG. 1, with the front section displaced; and FIG. 3 is a front, perspective view of the saddle of FIG. 1.

DETAILED DESCRIPTION OF THE PREFERRED EMBODIMENT

Referring now to the Figures wherein like numeral reflect identical parts, throughout the several views, FIG. 1 depicts saddle 1 having a fixed rear section 2, front section 4, frame 6, with two bars 8 supporting a shell 10 on which saddle cover 12 is secured. Frame 6 is connected by block 14 and saddle support 16. Block 14 contains clamps 18 and 20, which are braced against each other by locking screw 22 which securely positions the bars 8 between the clamps 18, 20. Saddle support 16 has an arc-shaped extension 24 arranged between lower clamp 20 and clamp 26 and is fixed by locking screw 22.

At the forward end of frame 6 is guide body 28 which has a "slide plane" 30, sloping toward the front section 4 of the saddle 1. The slide plane 30 is inclined with respect to vertical line 32 at an angle (alpha) of, for example, 45 degrees. At the lower end of guide body 28 is extension 34 extending toward front section 4 of the saddle 1, and has slot 36 into which guide arm 38 of the front section 4 is inserted in such manner that the front section 4 can be slid downward and forward along slide plane 30. By displacement along plane 30, the front section 4 yields, creating a gradual movement forward and downward with respect to rear section 2 of saddle 1, thus supporting the cyclist comfortably without great pressure. The gradual transition also prevents the formation of sharp edges which may injure the cyclist's genital area. Saddle cover 12 may be in two sections conforming with rear section 2 and front section 4 as is shown in FIGS. 1 and 2. Alternatively, saddle cover 12 may be fit continuously over rear section 2 and front section 4 as shown in FIG. 3. Such a continuous saddle cover has an elastic area in the region where front section 4 joins rear section 2 to accommodate the relative motion between the sections.

The guide arm 38 also has a lengthwise slot 40 into which a bolt 42 on extension 34 is inserted, so that front section 4 slides between an upper basic position in which the front section 4 is flush with the rear section 2, and a lower position determined by the upper end of slot 40. At bolt 44 of extension 34, there is pre-loading spring 46, having one or more coils around bolt 44, an arm 48 pressing against shell 10 of front section 4 and an arm 50 pressing against stopper 52. The spring 46 is designed as a torsion spring pre-loading the front section 4 in the basic position by spring arm 48 and supported by another spring arm 50 at stopper 52 of extension 34. The front section 4 thus yields downwardly and forwardly depending on the amount of pressure exerted upon it to overcome the pre-load of spring 46.

While the preferred embodiment of the invention has been illustrated in detail, modifications and adaptations of such embodiments will be apparent to those skilled in the art. However, it is to be expressly understood that such modifications and adaptations are within the spirit and scope of the present inventions as set forth in the following claims:

I claim:

1. A bicycle saddle, comprising:
 (a) a broad rear section with a forward projecting extension having a slot therein;
 (b) a front section with a guide arm angled downward and forward; said guide arm slidably engaged in said slot in said extension;

(c) a slide plane at the forward face of said rear section;

(d) a pre-loading means positioned between said front section and said extension for upwardly pre-lading said front section a position even with said rear section to whereby pressure exerted on said front section causes said guide arm to slide downwardly and forwardly along said slide plane.

2. The saddle of claim 1 wherein said pre-loading means is a torsion spring positioned between said extension and said front section.

3. The saddle of claim 1 wherein said guide arm has a slot engaged by a pin on said extension whereby the downward and upward travel of said front section is limited.

4. The saddle of claim 1, 2 or 3 further comprising a saddle cover, for covering said rear section and said front section wherein said saddle cover is elastic in the area between said rear and front sections.

* * * * *